(12) United States Patent
Nainar et al.

(10) Patent No.: US 10,812,378 B2
(45) Date of Patent: *Oct. 20, 2020

(54) SYSTEM AND METHOD FOR IMPROVED SERVICE CHAINING

(71) Applicant: Cisco Technology, Inc., San Jose, CA (US)

(72) Inventors: Nagendra Kumar Nainar, Morrisville, NC (US); Carlos M. Pignataro, Cary, NC (US); James N. Guichard, New Boston, NH (US); Paul Quinn, Wellesley, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,036

(22) Filed: Jan. 18, 2019

(65) Prior Publication Data

US 2019/0158398 A1 May 23, 2019

Related U.S. Application Data

(63) Continuation of application No. 15/080,493, filed on Mar. 24, 2016, now Pat. No. 10,187,306.

(51) Int. Cl.
*H04L 12/715* (2013.01)
*H04L 12/46* (2006.01)

(52) U.S. Cl.
CPC .......... *H04L 45/64* (2013.01); *H04L 12/4641* (2013.01); *H04L 12/4633* (2013.01)

(58) Field of Classification Search
CPC .. H04L 45/64; H04L 12/4641; H04L 12/4633
See application file for complete search history.

(56) References Cited

U.S. PATENT DOCUMENTS 3,629,512 A 12/1971 Yuan
4,769,811 A 9/1988 Eckberg, Jr. et al.
(Continued)

FOREIGN PATENT DOCUMENTS

CN 103716123 4/2014
CN 103716137 4/2014
(Continued)

OTHER PUBLICATIONS

Aldrin, S., et al. "Service Function Chaining Operation, Administration and Maintenance Framework," Internet Engineering Task Force, Oct. 26, 2014, 13 pages.
(Continued)

*Primary Examiner* — Will W Lin
(74) *Attorney, Agent, or Firm* — Polsinelli PC

(57) ABSTRACT

An apparatus having logic elements to receive an incoming packet associated with a first service function chain; identify a next hop service function for the incoming packet as a non-reactive service function; create a duplicate packet; forward the duplicate packet to the non-reactive service function; and forward the incoming packet to a next reactive service function. An apparatus having logic to receive an incoming packet associated with a first service function chain (SFC), having a first service path identifier (SPI); determine that the incoming packet has a first service index (SI), and that a next-hop SI identifies a non-reactive service function (NRSF); receive a duplicate packet of the incoming packet; rewrite a service header of the duplicate packet to identify a second SFC having a second SPI; and alter the first SI of the incoming packet to identify a next reactive service function in the first SFC.

20 Claims, 8 Drawing Sheets

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramaniam Chandra |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta et al. |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 * | 11/2015 | Guichard .............. H04L 45/566 |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 * | 8/2016 | Kumar .................. H04L 45/306 |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 * | 6/2018 | Zhang .................. H04L 45/306 |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |

(56) References Cited

U.S. PATENT DOCUMENTS

| | | |
|---|---|---|
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Shannon, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1* | 12/2014 | Guichard ............ H04L 43/0823 370/221 |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1* | 3/2015 | Kumar .................. H04L 45/306 370/392 |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1* | 1/2016 | Zhang .................. H04L 45/306 370/389 |
| 2016/0043952 A1 | 2/2016 | Zhang et al. |

(56) References Cited

U.S. PATENT DOCUMENTS

| | | |
|---|---|---|
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0099853 A1 | 4/2016 | Nedeltchev et al. |
| 2016/0119159 A1 | 4/2016 | Zhao et al. |
| 2016/0119253 A1* | 4/2016 | Kang .................. H04L 67/2814 370/228 |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1* | 6/2016 | Connor ............... G06F 9/45558 709/203 |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1* | 12/2016 | Wang .................... H04L 45/306 |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0093658 A1* | 3/2017 | Ryan .................... H04L 43/067 |
| 2017/0187609 A1* | 6/2017 | Lee ..................... H04L 12/6418 |
| 2017/0208000 A1 | 7/2017 | Bosch et al. |
| 2017/0214627 A1* | 7/2017 | Zhang .................... H04L 47/31 |
| 2017/0237656 A1* | 8/2017 | Gage ....................... H04L 45/74 370/392 |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.

Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

(56) References Cited

OTHER PUBLICATIONS

Author Unknown, "Service-Aware Network Architecture Based on SDN, NFV, and Network Intelligence," 2014, 8 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Bremler-Barr, Anat, et al., "Deep Packet Inspection as a Service," CoNEXT '14, Dec. 2-5, 2014, pp. 271-282.
Cisco Systems, Inc. "Cisco NSH Service Chaining Configuration Guide," Jul. 28, 2017, 11 pages.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration—An Overview," Presentation at the IETF#88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.
Hendrickson, Scott, et al. "Serverless Computation with OpenLambda," Elastic 60, University of Wisconsin, Madison, Jun. 20, 2016, 7 pages, https://www.usenix.org/system/files/conference/hotcloud16/hotcloud16_hendrickson.pdf.
Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Quinn, Paul, et al., "Service Function Chaining: Creating a Service Plane via Network Service Headers," IEEE Computer Society, 2014, pp. 38-44.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Zhang, Ying, et al. "StEERING: A Software-Defined Networking for Inline Service Chaining," IEEE, 2013, IEEE, p. 10 pages.

\* cited by examiner

SYSTEM AND METHOD FOR IMPROVED SERVICE CHAINING

CROSS-REFERENCE TO RELATED APPLICATIONS

This application is a continuation of U.S. application Ser. No. 15/080,493, filed on Mar. 24, 2016, the content of which is incorporated herein by reference in its entirety.

FIELD OF THE SPECIFICATION

This disclosure relates in general to the field of computer networking, and more particularly, though not exclusively to, a system and method for improved service chaining.

BACKGROUND

In an example contemporary computer architecture, functions such as firewalls, deep packet inspection (DPI), antivirus, load balancing, and network address translation (NAT) to name just a few, may be provided via network function virtualization (NFV). In NFV, each network node may be virtualized into a single-function virtual machine (VM), and several such single-function VMs may be provided on a single physical computer node, such as a rack-mount or blade server. Instances of virtual network functions (VNFs) may be "spun up" as needed to meet demand, and then "spun down" when demand decreases.

The path that a packet follows as it traverses the virtual network may be referred to as a "service function chain" (SFC). For example, if a packet is to be first inspected by a firewall, then by a DPI, and finally sent to a NAT, before finally being forwarded to the workload (WL) server, the service chain (starting from an edge router (ER)) may include ER→FW→DPI→NAT→WL.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
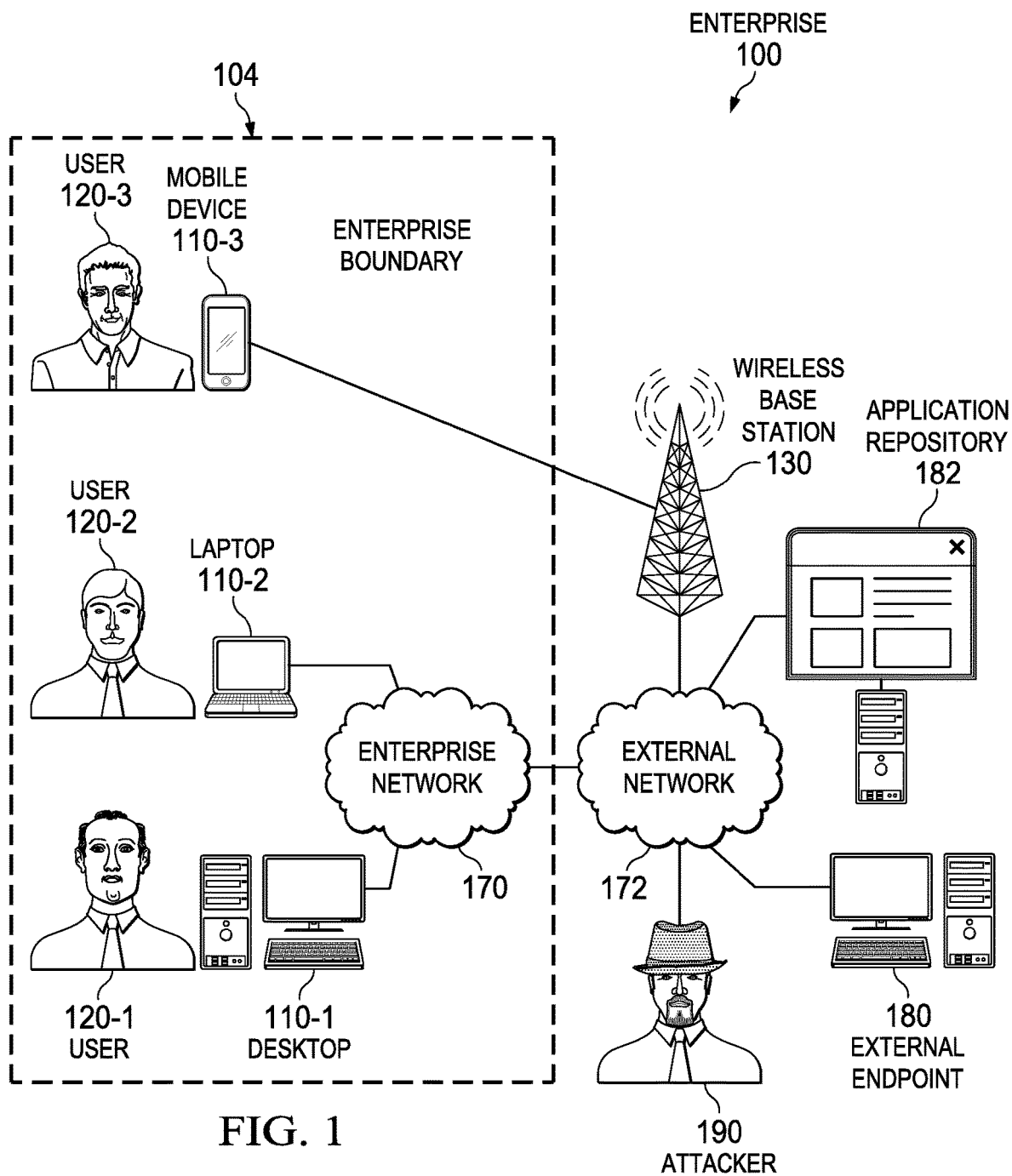
FIG. 1 is a block diagram of a network architecture according to one or more examples of the present Specification.

There is disclosed an apparatus having logic elements to: receive an incoming packet associated with a first service function chain; identify a next hop service function for the incoming packet as a non-reactive service function; create a duplicate packet; forward the duplicate packet to the non-reactive service function; and forward the incoming packet to a next reactive service function. There is also disclosed an apparatus having logic to: receive an incoming packet associated with a first service function chain (SFC), having a first service path identifier (SPI); determine that the incoming packet has a first service index (SI), and that a next-hop SI identifies a non-reactive service function (NRSF); receive a duplicate packet of the incoming packet; rewrite a service header of the duplicate packet to identify a second SFC having a second SPI, wherein the second SPI is different from the first SPI; and alter the first SI of the incoming packet to identify a next reactive service function in the first SFC.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In an example service function chain (SFC), a set of service functions (SF) may be applied in a linear or sequential fashion. For example, from a classifier at an ER to an egress interface at a WL server, the path may include Classifier→SF1→SF2→SF3→SF4 Egress. Some service functions are required, in certain embodiments, to be applied in a particular manner. For example, in some embodiments, NAT must be applied after DPI to avoid assigning an address to a flow that will end up being marked as "Spam" and dropped by the DPI. But in other embodiments, it is practical to apply certain service functions in parallel.

For example, a non-reactive service function (NRSF) includes any function that does not, or in the context of the specific network, cannot modify a packet. NRSFs may include, for example, traffic monitoring functions, accounting or billing functions, transparent cache functions, and lawful intercept functions by way of nonlimiting example. In some cases, NRSFs may include "testbed" SFs that are intended to be reactive SFs in the future, but that are currently undergoing testing and thus should not be permitted to modify "live" flows. Rather, they may simply perform "dummy" operations on duplicate flows and log the results so that the function can be evaluated. Thus, while these functions may be intended to modify packets in a general sense, in the context of the specific network, they may not be permitted to modify a packet.

In the case where an NRSF is a midpoint in a service chain, it may internally perform work based on the content of the packet, but from the perspective of the service chain, its only function is to forward the packet to the next hop in the service chain. If the NRSF is a terminal in the service chain, its only function (again, from the perspective of the service chain) is to drop the packet.

In the example above, the SFC includes SFs like firewall, DPI, and NAT in addition to non-reactive service function like monitoring. In that case, there may be no compelling need for a packet to be processed by a NRSF before it is passed on to a reactive SF. This may be true even if the NRSF is the last function in the SFC. But like any SF, NRSFs may result in performance penalties. For example:

If there is any performance issue in the NRSF (like packet drop or delay/jitter), end-to-end traffic may suffer a corresponding performance issue.

If there is any performance issue (like packet loss, delay/jitter) in path from SF1 (firewall) to SF2 (NRSF), end-to-end traffic may suffer a corresponding performance issue.

If the NRSF is a testbed service function, it may be unproven, and may introduce delays or errors into service function flows.

In a general sense, the foregoing possibilities may be true of any given SF. However, NRSFs present a special case because from the perspective of the SFC, it performs no "work." Thus, the risk of any delay or error presented by an NRSF has no corresponding tradeoff (i.e., a useful or necessary function performed) for the SFC.

Embodiments of the present Specification describe an extension of existing SFC topologies that make it possible for a network administrator to identify and mark NRSFs in an SFC. When the SFC encounters the NRSF, rather than forwarding the original packet and risking an unnecessary bottleneck, a duplicate packet is created with a rewritten network services header (NSH) (or corresponding metadata). The modified NSH identifies a new SFC, which contains only one or more NRSFs. This duplicate packet is forwarded to the new chain, and the one or more NRSFs receive the packet and perform their function. In the meantime, the "service index" (SI) field in the NSH of the original packet is incremented by one or more (corresponding to the number of NRSFs "skipped" in this step), and is forwarded in parallel to the next reactive SF in the chain. This ensures that the one or more NRSFs receive the packets in the service chain, but that they cannot become a bottleneck, regardless of whether they function correctly or efficiently.

In some cases, the foregoing methods may be provided within a software-defined network (SDN), with management of the service chaining performed by an SDN controller (SDN-C), including an SDN-C engine, which may include a service-chaining engine. In one example, the SDN-C engine may instantiate an industry-standard platform, such as OpenDaylight, which supports open standards to provide an open source framework and platform for SDN control. Note however that SDN and SD-C are provided only as nonlimiting, illustrative examples. Any suitable network structure may be provided, with the service chaining engine residing on any suitable hardware, firmware, and/or software platform.

A system and method for improved service chaining will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a networked enterprise 100 according to one or more examples of the present Specification. Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, along with appropriate software. In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Networked enterprise 100 may encounter a variety of "network objects" on the network. A network object may be any object that operates on, interacts with, or is conveyed via enterprise network 170. In one example, objects may be broadly divided into hardware objects, including any physical device that communicates with or operates via the network, software objects, and other logical objects.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 190. It may be a goal for enterprise 100 to provide access to desirable services, such as application repository 182 and external endpoint 180, while excluding malicious objects such as attacker 190.

In some cases, networked enterprise 100 may be configured to provide services to external endpoint 180. For example, networked enterprise 100 may provide a website that its customers access via external endpoint 180. The website may be an important means for distributing key information to users and customers. In other examples, networked enterprise 100 may provide services such as webmail, file transfer protocol (FTP), file hosting or sharing, cloud backup, or managed hosting to clients operating external endpoint 180. Thus, in some cases, enterprise network 172 provides business-critical customer-facing network services. Enterprise network 172 may also provide business-critical services to enterprise users 120, such as an intranet, file server, database server, middleware, or other enterprise services.

Wireless base station 130 may provide mobile network services to one or more mobile devices 110, both within and without enterprise boundary 104.

Application repository 182 may represent a Windows or Apple "App Store" or update service, a Unix-like repository or ports collection, or other network service providing users 120 the ability to interactively or automatically download and install applications, patches, or other software on client devices 110.

Figure 2:
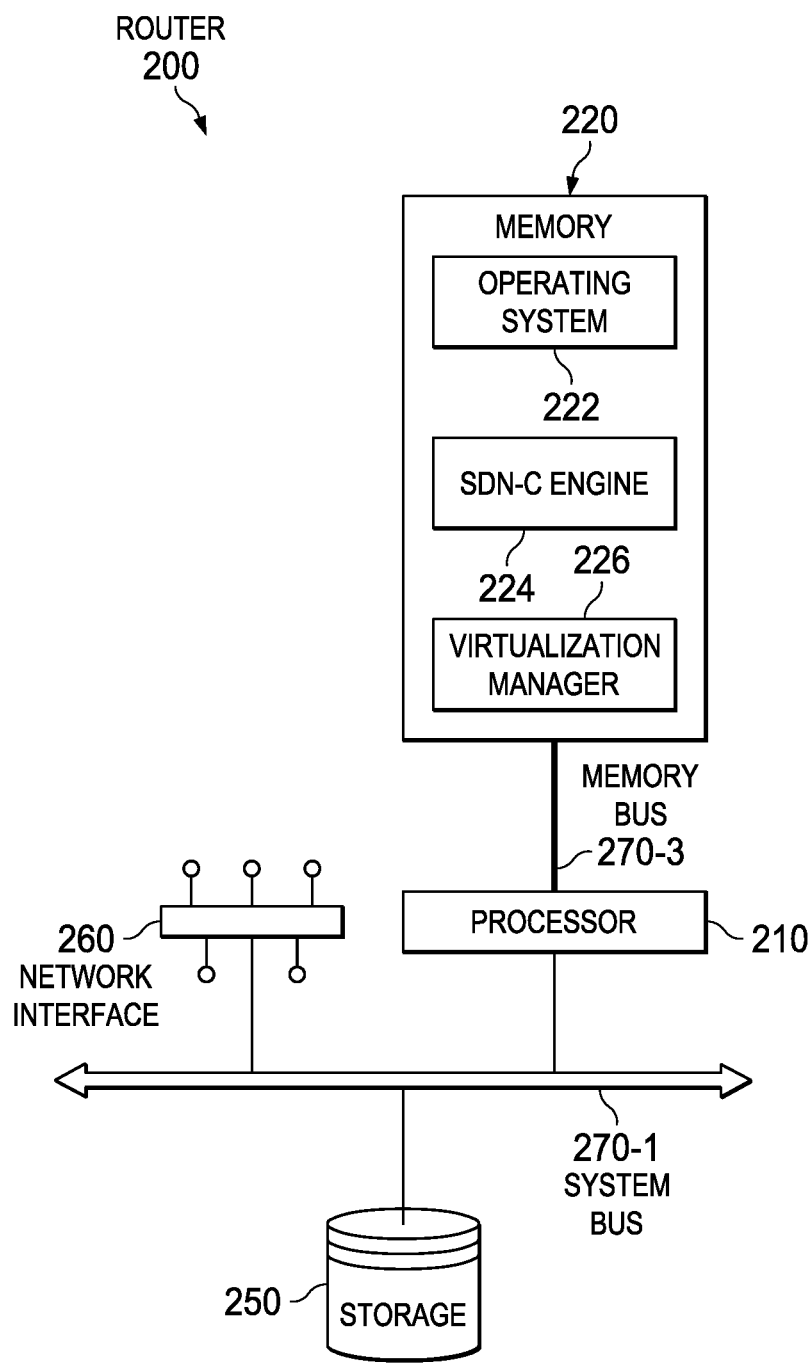
FIG. 2 is a block diagram of a computing device, according to one or more examples of the present Specification.

FIG. 2 is a block diagram of computing device such as a router 200 according to one or more examples of the present Specification. Router 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

Router 200 is disclosed by way of nonlimiting example to illustrate a suitable hardware and software platform for providing a software-defined networking controller (SDN-C) engine 224 and/or a virtualization manager. It should be noted that SDN-C 224 and virtualization manager 226 may be provided on the same hardware platform, or on different hardware platforms, each of which may include some or all of the hardware and logical structures disclosed herein, separately or in combination. The hardware platform providing zero, one, or both of these engines may function as a router within the network, such as enterprise network 170, or may be some other kind of hardware. In a general sense, it should be understood that in a world where many network functions can be virtualized on many different kinds of platforms, many different configurations are possible, all of which would fall well within the spirit and scope of the appended claims.

In this example, router 200 includes a processor 210 connected to a memory 220, having stored therein executable instructions for providing an operating system 222 and at least software portions of a SDN-C engine 224. Other components of router 200 include a storage 250, and network interface 260. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this Specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this Specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processors may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this Specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of SDN-C engine 224. Many other configurations are also possible, and are intended to be encompassed within the broad scope of this Specification.

Network interface 260 may be provided to communicatively couple router 200 to a wired or wireless network. A "network," as used throughout this Specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

SDN-C engine 224, in one example, is operable to carry out computer-implemented methods as described in this Specification. SDN-C engine 224 may include one or more tangible non-transitory computer-readable mediums having stored thereon executable instructions operable to instruct a processor to provide an SDN-C engine 224. As used throughout this Specification, an "engine" includes any combination of one or more logic elements, of similar or dissimilar species, operable for and configured to perform one or more methods provided by the engine. Thus, SDN-C engine 224 may comprise one or more logic elements configured to provide methods as disclosed in this Specification. In some cases, SDN-C engine 224 may include a special integrated circuit designed to carry out a method or a part thereof, and may also include software instructions operable to instruct a processor to perform the method. In some cases, SDN-C engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that SDN-C engine 224 may also include other hardware and software, including configuration files, registry entries, and interactive or user-mode software by way of non-limiting example.

In one example, SDN-C engine 224 includes executable instructions stored on a non-transitory medium operable to perform a method according to this Specification. At an appropriate time, such as upon booting router 200 or upon a command from operating system 222 or a user 120, processor 210 may retrieve a copy of the instructions from storage 250 and load it into memory 220. Processor 210 may then iteratively execute the instructions of SDN-C engine 224 to provide the desired method. SDN-C engine 224 may be configured to provide service chaining, including for example the service chaining architecture disclosed in FIGS. 4 and 5.

In this embodiment, SDN-C engine 224 provides a service-chaining engine. Note however that the service-chaining engine is shown within SDN-C engine 224 by way of non-limiting example only. In a more general sense, the service-chaining engine may be any engine according to the present disclosure. The service-chaining engine may be configured to carry out methods according to this Specification, including for example the methods illustrated in FIGS. 6a, 6b, and 7.

Further in this example, on the same, shared, or on separate hardware, a virtualization manager 226 is shown. Virtualization manager 226 may be an engine according to the present disclosure. Non-limiting examples of virtualization managers include VMware ESX (or enhancements thereof, such as vSphere), Citrix XenServer, or Microsoft Hyper-V. The foregoing are all examples of "type 1" hypervisors, but it should be noted that other types of virtualization managers may be used, including type 2 hypervisors, or other virtualization solutions.

Figure 3:
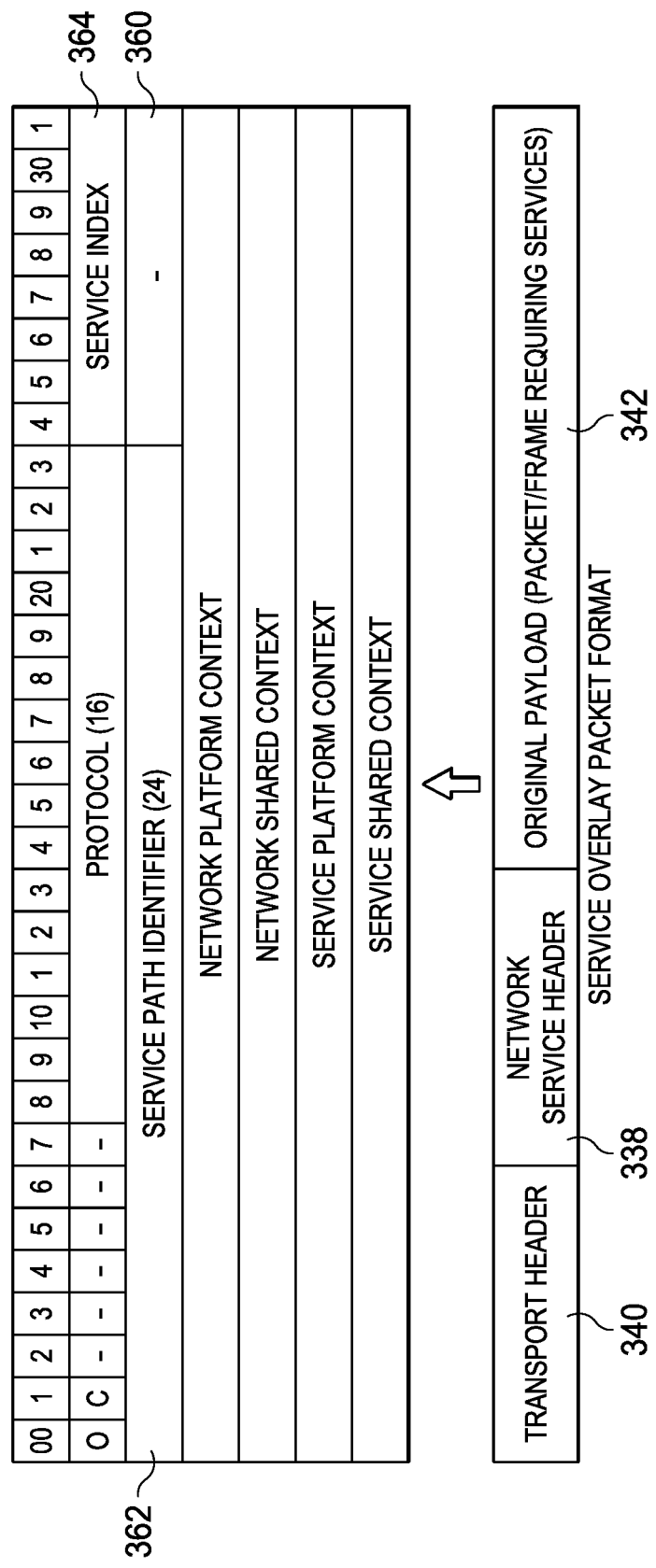
FIG. 3 is a block diagram of a packet header according to one or more examples of the present Specification.

FIG. 3 is a simplified block diagram illustrating an example service overlay packet format according to an embodiment of the present Specification. The example service overlay packet format may include NSH 338, transport header 340 and payload 342. In this example, NSH 338 includes four 32-bit context headers (e.g., service shared context, service platform context, network shared context, and network platform context), and an additional header 360 comprising the 24-bit service path identifier (SPI) 362 and 8-bit service index (SI) 364. In this example, SPI 362 is a numeric designator that identifies a particular SFC that payload 342 is to traverse. This identifier may be stored in a table accessible by SDN-C engine 224. SI 364 identifies the hop in the SFC that the packet currently is on.

In an embodiment where parallel handling of NRSFs is not provided, a service node may receive an incoming packet, perform its function, and then increment SI 364 of NSH 338. Thus, when the service function sends the packet back out to the network, it is delivered to the next hop in the SFC.

Figure 7:
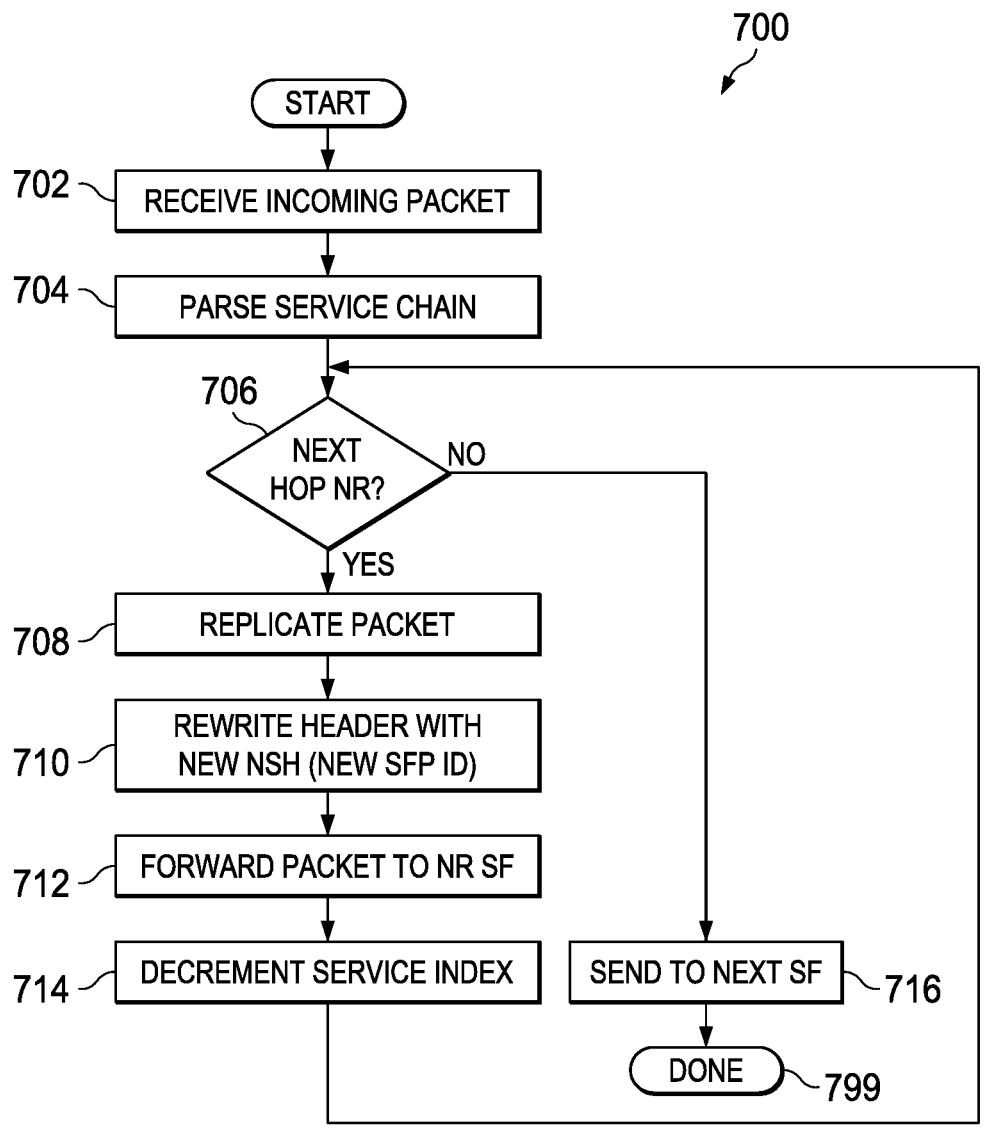
FIG. 7 is a flow chart of a method according to one or more examples of the present Specification.

In embodiments of the present Specification wherein parallel handling of NRSFs is provided, SI 364 may be incremented according to method 700 of FIG. 7.

Figure 4:
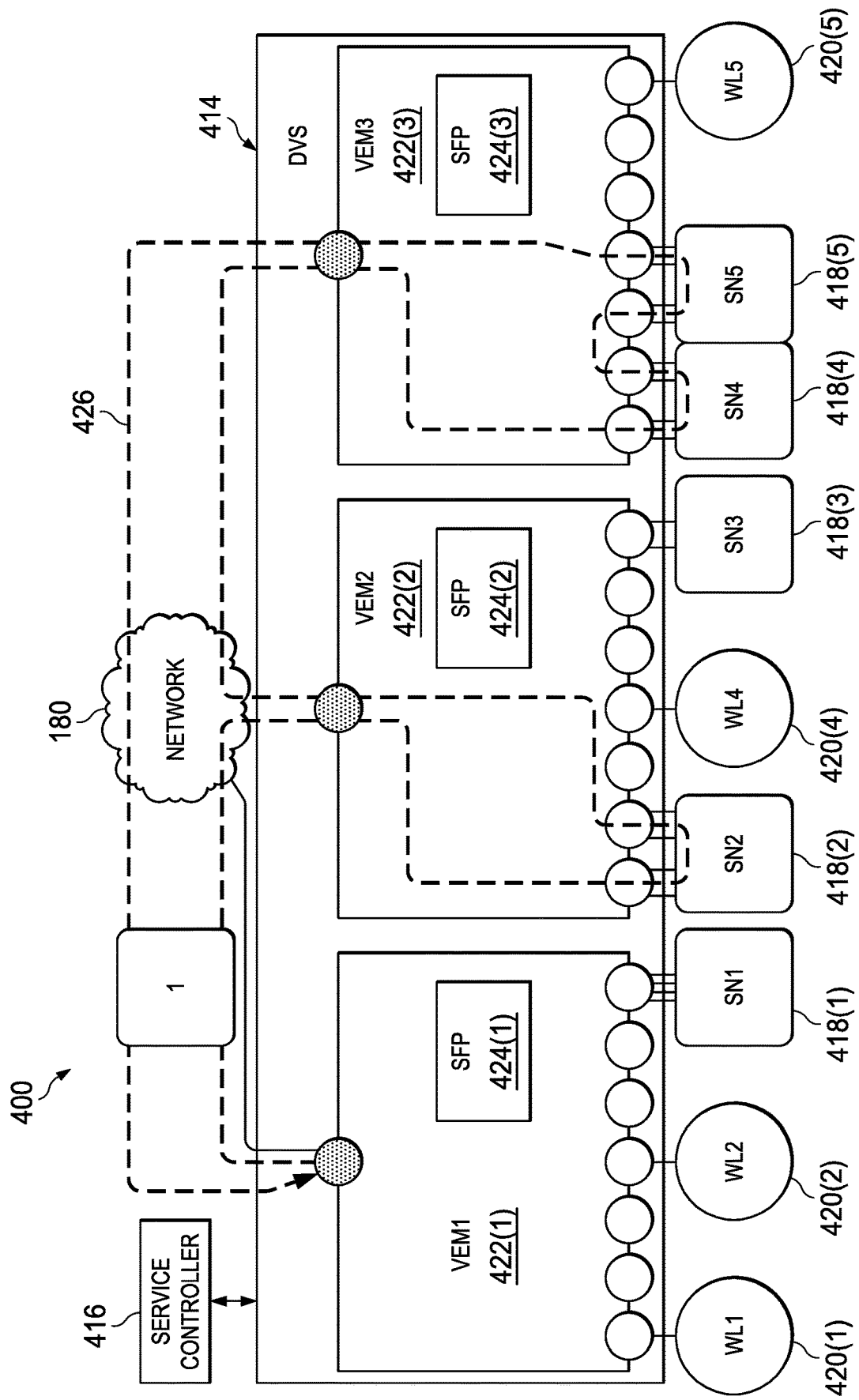
FIG. 4 is a block diagram of a service chain according to one or more examples of the present Specification.

FIG. 4 is a simplified block diagram illustrating a communication system 400 for distributed service chaining in a network environment according to one or more examples of the present Specification. FIG. 4 illustrates a network 180 (generally indicated by an arrow) comprising a distributed virtual switch (DVS) 414, which is provided as a non-limiting example of a platform for providing a service-chaining network. DVS 414 can include a service controller 416, which may be an SDN-C controller, such as the one provided by router 200 of FIG. 2, or any other suitable platform. A plurality of service nodes (SN) 418 (e.g., SNs 418(1)-418(5)) may provide various network services to packets entering or leaving network 180. A plurality of virtual machines (VMs) may provide respective workloads (WLs) 420 (e.g., WL 420(1)-420(5)) on DVS 414, for example, by generating or receiving packets through DVS 414. One or more virtual Ethernet modules (VEMs) 422 (e.g., VEMs 422(1)-422(3)) may facilitate packet forwarding by DVS 414. In various embodiments, DVS 414 may execute in one or more hypervisors in one or more servers (or other computing and networking devices) in network 180. Each hypervisor may be embedded with one or more VEMs 422 that can perform various data plane functions such as advanced networking and security, switching between directly attached virtual machines, and uplinking to the rest of the network. Each VEM 422(1)-422(3) may include respective service function paths (SFPs) 424(1)-424(3) that can redirect traffic to SNs 418 before DVS 414 sends the packets into WLs 420.

Note that although only a limited number of SNs 418, WLs 420, VEMs 422, and SFPs 424 are provided in the FIGURE for ease of illustration, any number of service nodes, workloads, VEMs and SFPs may be included in communication system 400 within the broad scope of the embodiments. Moreover, the service nodes and workloads may be distributed within network 180 in any suitable configuration, with various VEMs and SFPs to appropriately steer traffic through DVS 414.

Embodiments of communication system 400 can facilitate distributed service chaining in network 180. As used herein, the term "service chain" includes an ordered sequence of a plurality of services provided by one or more SNs (e.g., applications, virtual machines, network appliances, and other network elements that are configured to provide one or more network services) in the network. A "service" may include a feature that performs packet manipulations over and beyond conventional packet forwarding. Examples of services include encryption, decryption, intrusion management, firewall, load balancing, wide area network (WAN) bandwidth optimization, application acceleration, network based application recognition (NBAR), cloud services routing (CSR), virtual interfaces (VIPs), security gateway (SG), network analysis, deep packet inspection (DPI), and data and accounting services, by way of non-limiting example. The service may be considered an optional function performed in a network that provides connectivity to a network user. The same service may be provided by one or more SNs within the network.

According to some embodiments, a user (e.g., network administrator) can configure the service chain and provision it directly at an applicable workload 420 (e.g., WL 420(1)). In some cases, this may include identifying and configuring non-reactive service functions (NRSFs).

Service controller 416 may segment the user configured service chain in DVS 414. According to various embodiments, VEMs 422(1)-422(3) may generate headers for forwarding packets according to the configured service chain such that substantially all services in the service chain may be provided in a single service loop irrespective of the number of services, with respective VEMs 422(1)-422(3) making independent decisions (e.g., without referring to other VEMs or other network elements) about the next hop decisions in the service chain packet forwarding. As used herein, the term "service loop" refers to a path of the packet from a starting point (e.g., WL 420(1)) through various service nodes (e.g., SN 418(2), SN 418(4), SN 418(5)) of the service chain until termination at the starting point (e.g., WL 420(1)). The service chain traffic may be steered over network 180 in a service overlay 426. Note that it is not always necessary to terminate the starting point, so that this may not necessarily be a "loop." It is intended for "service loop" to encompass the operation in either case.

As used herein, the term "service controller" includes an engine that can provision services at one or more service nodes according to preconfigured settings. The preconfigured settings may be provided at the service controller by a user through an appropriate command line interface, graphical user interface, script, or other suitable means. The term "VEM" includes one or more network interfaces, at least some portions of switching hardware and associated firmware and software, and one or more processes managing the one or more network interfaces to facilitate packet switching in a switch, including a distributed virtual switch (e.g., DVS 414). VEMs may be named as service VEMs when they provide connectivity to service nodes, and as classifier VEMs when they provide connectivity to the workloads that function as the initial node in a service chain. In certain embodiments, one or more VEMs may be provided in an instance of a Cisco® unified computing system (UCS) rack server.

Service overlay 426 encompasses a level of indirection, or virtualization, allowing a packet (e.g., unit of data communicated in the network) destined to a specific workload to be diverted transparently (e.g., without intervention or knowledge of the workloads) to other service nodes as appropriate. Service overlay 426 includes a logical network built on top of existing network 180 (the underlay). Packets are encapsulated or tunneled to create the overlay network topology. For example, service overlay 426 can include a suitable header (e.g., a network service header (NSH)), with corresponding source and destination addresses relevant to the service nodes in the service chain.

For purposes of illustrating the techniques of communication system 400, it is important to understand the communications that may be traversing the system. The following foundational information may be viewed as a basis from which the present disclosure may be properly explained. Such information is offered earnestly for purposes of explanation only and, accordingly, should not be construed in any way to limit the broad scope of the present disclosure and its potential applications.

Service chaining involves steering traffic through multiple services in a specific order. The traffic may be steered through an overlay network, including an encapsulation of the packet to forward it to appropriate service nodes.

Service chains are orchestrated in a centralized fashion in the network infrastructure. Each VEM 422(1)-422(3) may serve as an originator of respective network service headers (NSHs) for service overlay 426. As used herein, the term "network service header" includes a data plane header (e.g., metadata) added to frames/packets (see, e.g., FIG. 3). The NSH contains information required for service chaining, and metadata added and consumed by SNs 418 and WLs 420. (Examples of metadata include classification information used for policy enforcement and network context for forwarding post service delivery). According to embodiments of communication system 400, each NSH may include a service path identifier identifying the service chain to which a packet belongs, and a location of the packet on the service chain, which can indicate the service hop (NSH aware node to forward the packet) on service overlay 426. The service path identifier and the location of the packet can comprise any suitable text, number or combination thereof. In an embodiment, the service path identifier is a 24-bit number, and the location may be specified by an 8-bit number. In appropriate circumstances, service chains may include both agentful and agentless nodes.

According to various embodiments, a user may configure (e.g., provision, arrange, organize, construct, etc.) the service chains at service controller 416. Service controller 416 may discover the location of service nodes 418(1)-418(5). In some embodiments, the service chain may be provisioned by service controller 416 in a port profile at respective SFPs 424(1)-424(3) associated with specific workloads 420 that instantiate the service chains, thereby binding the service policy including the service chain with the network policy included in the port profile. In other embodiments, when service chains are instantiated at classifier VEM 422(1), associated with the initiating workload 420(2), service controller 416 may be notified of the service chain instantiation. Service controller 416 may assign a path identifier to each instantiated service chain. Service controller 416 may populate service forwarding table entries indicating the next service hop for respective service chains identified by corresponding path identifiers. Service controller 416 may program service-forwarding tables at appropriate VEMs 422 based on service node discovery information.

Merely for illustrative purposes, and not as a limitation, assume a service chain 1 provisioned at WL 420(2) as follows: WL2→SN2→SN4→SN5. In other words, a packet originating at WL 420(2) may be steered to SN 418(2), serviced accordingly, then to SN 418(4), then to SN 418(5), and finally returned to WL 420(2). VEM 422(1) may generate an NSH including the Internet Protocol (IP) or Media Access Control (MAC) address of VEM 422(1) at which WL 420(2) is located as a source address, and an IP/MAC address of SN 418(2) as the next service hop. Destination VEM 422(2), at which SN 418(2) is located may inspect the NSH and take suitable actions.

According to various embodiments, after the packet is suitably serviced at SN 418(2), VEM 422(2) may intercept the packet and lookup the next service hop. The NSH may be updated to indicate the next service hop as SN 418(4) (rather than WL 420(2), for example). The packet may be forwarded on service overlay 426 to the next service hop, where VEM 422(3) may intercept the packet, and proceed appropriately.

Embodiments of communication system 400 may decentralize the service forwarding decisions, with each VEM 422 making appropriate next service hop decisions. Any kind of network (e.g., enterprise, service provider, etc.) may implement embodiments of communication system 400 as appropriate.

Further, the service forwarding decision at any of VEMs 422(1)-422(3) may be limited to the next-hop of the service chain, rather than all hops of the service chain. For example, the next service hop decision at the classifier VEM (e.g., VEM 422(1)) may determine the first SN (e.g., SN 418(2)) in the service chain and may send the traffic on service overlay 426 to the first SN (e.g., SN 418(2)). The NSH may be written to indicate the source as VEM 422(1) and next service hop as SN 418(2): <overlay: source=VEM1, destination=SN2>. The service VEM (e.g., VEM 422(2)) at SN 418(2) may simply allow the traffic on service overlay 426 to pass through to SN 418(2).

After the service is delivered at the SN (e.g., SN 418(2)), the SN (e.g., SN 418(2)) may simply send the serviced traffic back on service overlay 426 to where traffic came from (e.g., WL 420(2), or VEM 422(1)). For example, SN 418(2) may write the NSH to indicate the source as SN 418(2) and destination as VEM 422(1): <overlay: source=SN2, destination=VEM1>. The return traffic may be intercepted by the service VEM (e.g., VEM 422(2)) next (or closest) to the SN (e.g., SN 418(2)). The intercepting service VEM (e.g., VEM 422(2)) may make the service forwarding decision, determining the next SN (e.g., SN 418(4)) in the service chain and re-originating the NSH to the next SN (e.g., SN 418(4)). The NSH may be rewritten to indicate the source as VEM 422(2) and destination as SN 418(4): <overlay: source=VEM2, destination=SN4>.

The process of service forwarding can continue from VEMs 422 to SNs 418 until all SNs in the service chain deliver services. The forwarding decision may be based on the presence or absence of an agent at SN 418. For example, assume that SN 418(4) is agentless, VEM 422(3) may notice that NSH indicates a destination of SN 418(4), which is agentless. VEM 422(3) may terminate service overlay 426 and perform translation to send the traffic to SN 418(4). After SN 418(4) delivers the service, it may simply send the original payload packet out, which may be received by VEM 422(3) for translation back onto service overlay 426. VEM 422(3) may intercept SN 418(4)'s traffic and determine the next service hop as SN 418(5) (which, for example purposes, may be agentful and on the same VEM as SN 418(4)). VEM 422(3) may re-originate NSH to SN 418(5): <overlay: source=VEM3, destination=SN5>. After the service is applied, SN 418(5) may simply re-originate the NSH back to VEM 422(3): <overlay: source=SN5, destination=VEM3>.

The service VEM (e.g., VEM 422(3)) intercepting the return traffic from the last SN (e.g., SN 418(5)) in the service chain may determine the end of service chain. If the last VEM (e.g., VEM 422(3)) is capable of forwarding the payload traffic, it may simply forward it on the underlay network (e.g., network 180). If on the other hand, the payload traffic can only be forwarded by classifier VEM (e.g., VEM 422(1)), the NSH may be re-originated by the last VEM (e.g., VEM 422(3)) back to the classifier VEM (e.g., VEM 422(1)). VEM 422(1) may receive the serviced packet on service overlay 426 and may determine that all services on the service chain are delivered. VEM 422(1) may forward the original payload packet, serviced by the service chain, natively or on the underlay network (e.g., network 180), as appropriate.

In some embodiments, for example, as in a service provider network environment that represents a non-homogeneous environment, the network infrastructure, including DVS 414 may be owned and operated by the provider; WLs 420 may belong to the tenants of the provider; and SNs 418 may be hosted by the provider on behalf of the tenant or hosted by the tenants themselves, or by other third parties. In some embodiments, for example, wherein the service provider hosts SNs 418 on behalf of the tenant, NSH of service overlay 426 may use the IP/MAC addresses of VEMs 422 and SNs 418 for source and destination addresses.

Within the infrastructure of communication system 400, the network topology can include any number of servers, virtual machines, switches (including distributed virtual switches), routers, and other nodes inter-connected to form a large and complex network.

VEMs 420 can include virtual interfaces (e.g., virtual equivalent of physical network access ports) that maintain network configuration attributes, security, and statistics across mobility events, and may be dynamically provisioned within virtualized networks based on network policies stored in DVS 414 as a result of VM provisioning operations by a hypervisor management layer. VEMs 422 may follow virtual network interface cards (vNICs) when VMs move from one physical server to another. The movement can be performed while maintaining port configuration and state, including NetFlow, port statistics, and any Switched Port Analyzer (SPAN) session. By virtualizing the network access port with DPs 424(2)-424(6), transparent mobility of VMs across different physical servers and different physical access-layer switches within an enterprise network may be possible. SFPs 424(1)-424(3) may provide intelligent traffic steering (e.g., flow classification and redirection), and fast path offload for policy enforcement of flows. SFPs 424(1)-424(3) may be configured for multi-tenancy, providing traffic steering and fast path offload on a per-tenant basis. Although only three SFPs 424(1)-424(3) are illustrated in FIG. 4, any number of SFPs may be provided within the broad scope of the embodiments of communication system 400.

Figure 5:
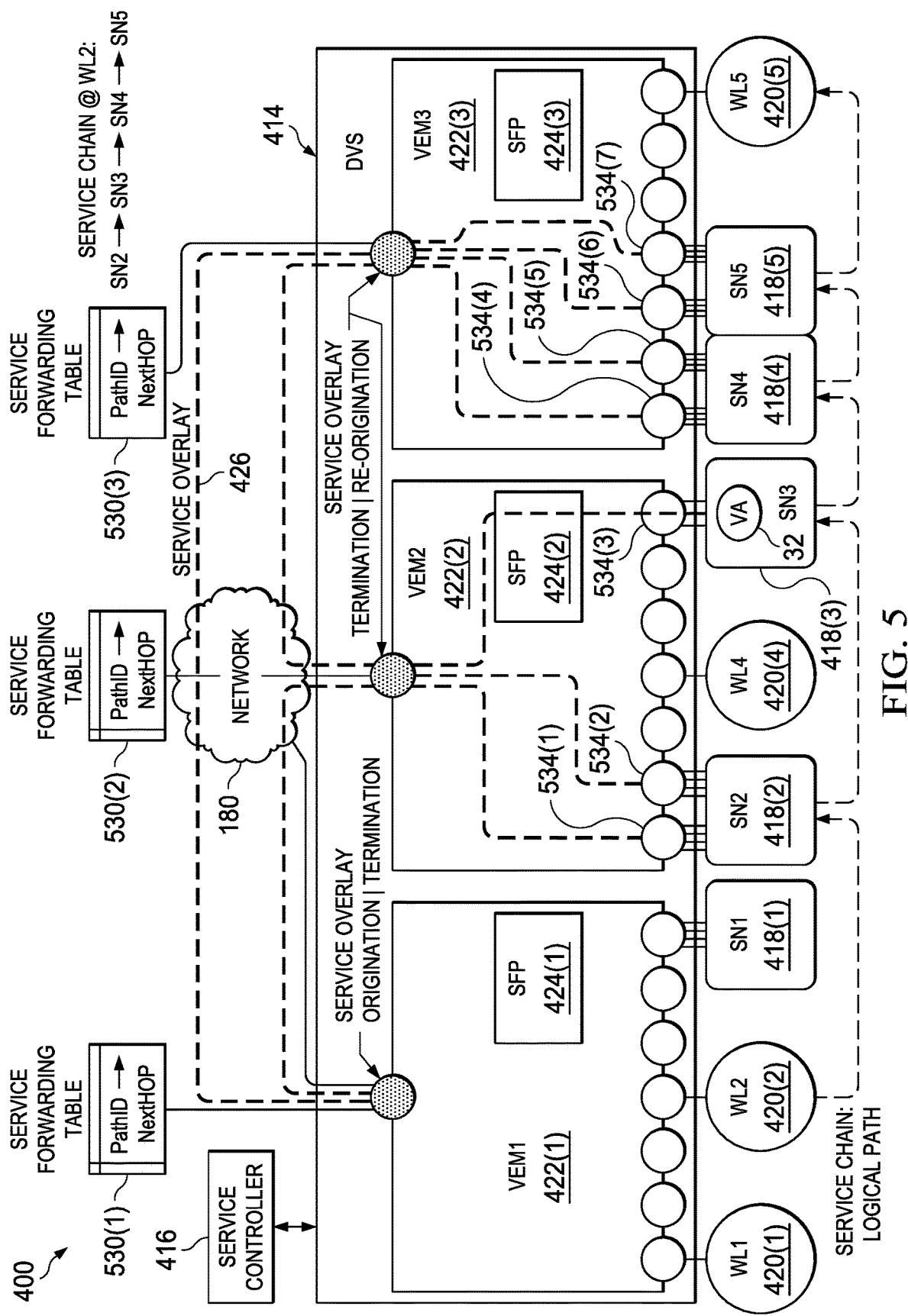
FIG. 5 is a block diagram of a service chain according to one or more examples of the present Specification.

FIG. 5 is a simplified block diagram illustrating example details that may be associated with an embodiment of communication system 400. An example service chain is illustrated in the figure, starting at WL 420(2), proceeding to SN 418(2), then to SN 418(3), then to SN 418(4), then to SN 418(5), and lastly, to WL 420(5): WL2→SN2→SN3→SN4→SN5→WL5. Service controller 416 may program service forwarding tables 530(1)-530(3) at respective VEMs 422(1)-422(3). Each service forwarding table 530(1)-530(3) may include an SPI 362 and an SI 364. Some SNs 418 may include an agent 32. Note that the configuration described herein is merely for example purposes, and is not intended to be a limitation of embodiments of communication system 400.

The packet from WL 420(2) may be encapsulated with the NSH at classifier VEM 422(1) based on information in service forwarding table 530(1). The packet may be forwarded on service overlay 426 to the next service hop, namely SN 418(2). VEM 422(2) may decapsulate the NSH, and forward the packet through interface 534(1) to SN 418(2). SN 418(2) may service the packet, and rewrite the packet header to indicate the destination address of VEM 422(1) and send the packet out through interface 534(2). VEM 422(2) may intercept the packet, and re-originate the NSH based on information in service forwarding table 530(2). The destination may be written to be the IP/MAC address of SN 418(3). After being serviced, the packet may be returned to VEM 422(2) via interface 534(3). VEM 422(2) may intercept the packet, and re-originate the NSH based on information in service forwarding table 530(2). The destination may be written to be the IP/MAC address of SN 418(4) and the packet forwarded to VEM 422(3) on service overlay 426.

VEM 422(3) may decapsulate the packet, and forward the packet to SN 418(4) over interface 534(4). SN 418(4) may service the packet appropriately, and attempt to return it to VEM 422(1) over interface 534(5). VEM 422(3) may intercept the packet, and re-originate the NSH based on information in service forwarding table 530(3). The destination may be written to be the IP/MAC address of SN 418(5) and the packet forwarded to SN 418(5) over interface 534(6). SN 418(5) may service the packet appropriately, and attempt to return it to VEM 422(1) over interface 534(7). VEM 422(3) may intercept the packet, and re-originate the NSH based on information in service forwarding table 530(3). In some embodiments, the destination may be written to be the IP/MAC address of WL 420(5) and the packet forwarded to WL 420(5) over network 180, or the appropriate interface. In other embodiments, the destination may be written to be the IP/MAC address of classifier VEM 422(1) and the packet forwarded to WL 420(2) on service overlay 426 as appropriate.

Figure 6A:
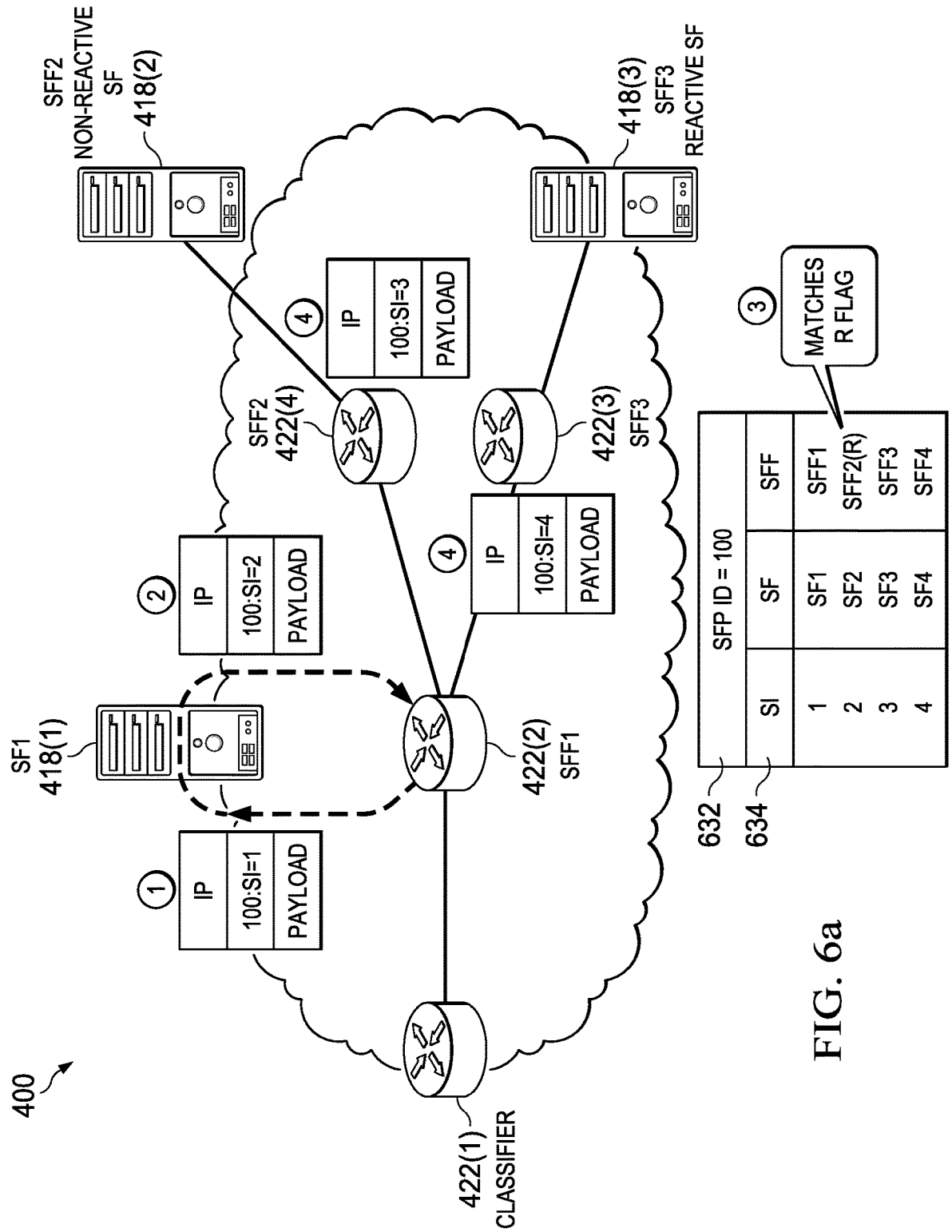
FIGS. 6A and 6B are block diagrams of a service forwarding method according to one or more examples of the present Specification.
Figure 6B:
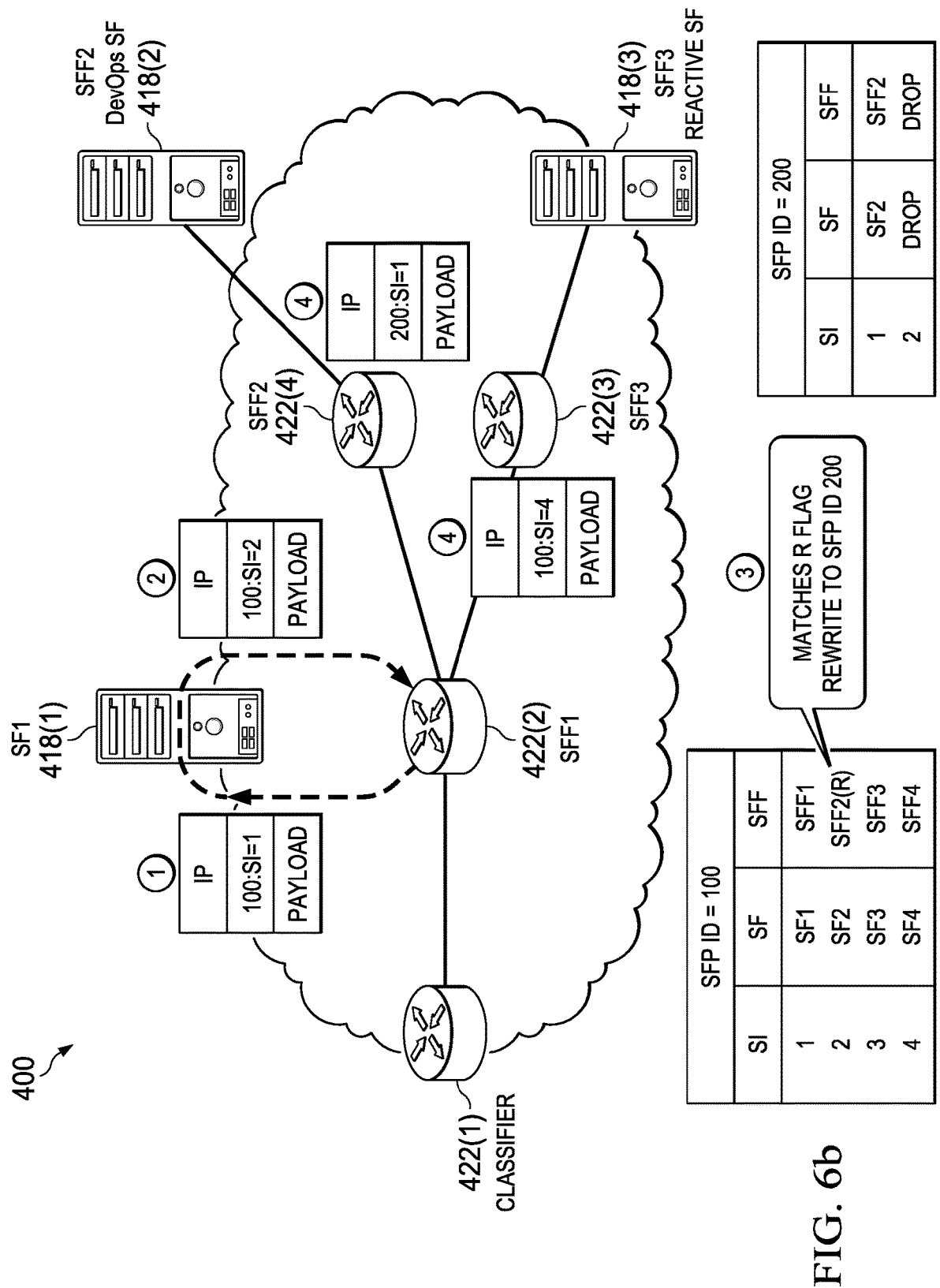

FIGS. 6A and 6B illustrate simplified aspects of a network 400. It should be noted that network 400 as illustrated in FIG. 6A could be the same network as is illustrated in FIGS. 4 and 5, or could be a different or separate network. The diagram of FIG. 6A is simplified to more closely focus on aspects of the disclosure that relate specifically to optimizing service chaining, such as in cases where an NRSF resides in the service chain, and it is desirable to ensure that the NRSF cannot become a bottleneck or point of failure that could affect other nodes in the service chain.

It should be noted that in the examples of FIGS. 6A and 6B, service chaining may be accomplished substantially as illustrated in FIGS. 4 and 5, with the exceptions illustrated in these FIGURES.

In FIG. 6A, SDN-C 416 may instantiate an SPI 362 for each SFF 422. For some SFFs 422, SDN-C 416 may also instantiate a replicate (R) flag, indicating that the next SFF 422 is a NRSF. Note that an SFF 422 need not be non-reactive en grosse. Rather, some SFFs 422 may be non-reactive with respect to certain types of packets, and reactive with respect to other types of packets. Thus, a particular SFF 422 may be reactive with respect to a first service chain, and non-reactive with respect to a second service chain. Note that it is the responsibility of the network administrator, as a design decision, to designate which SFFs 422 are nonreactive with respect to each service chain.

Alternatively, the network administrator may designate an entire service chain as non-reactive, and thus keep all non-reactive functions in a separate service chain.

When an SFF 422 encounters a packet and, examining the SFP table, determines that the next SFF 422 is non-reactive (as designated by the R flag), may perform the following:

Replicate the packet and rewrite the NSH header (in case of new SPI 362), or decrement SI 364 and forward to next SFF 422.

Rewrite the SI 364 and forward to the next SFF 422 in the SFC.

For example, in FIG. 6A, SF2 (hosted on SFF2 422(4)) is identified as non-reactive with respect to the present flow, and thus can be processed in parallel. Thus, as illustrated in FIG. 6B, SDN-C 416 populates the SFC table by marking SI=2 with an "R" flag for the service chain identified as SPI=100.

Later, when SFF1 receives the packet back from SF1 (with SI=2), it notes the "R" flag in table and replicates the packet. SF1 then rewrites the original packet with SI incremented, and forwards the packet to SFF2 and SFF3 in parallel. SFF3 now receives the packet as though it had already passed through SFF2, and proceeds with the service chain as normal.

SFF2, for its part, forwards the packet to SFF2. SFF2 forwards the packet to SF2. Once SF2 processes the packet, it returns the packet to SFF2. Because SFF2 notes that SF2 is the terminal node in the modified "parallel" service chain, there is nothing more to do with the packet, and SFF2 silently drops the packet.

Additional details are visible in FIG. 6B. As can be seen, SF2 (hosted in SFF2) is an NRSF. According to a configuration by the network administrator, SDN-C 416 programs SFF2 with SPI=200. SPI=200 may be a special-purpose non-reactive service function chain (NRSFC), which contains only one or more NRSFs. In this example, SF2 is the only function in SPI=200. Thus, the "next" action (after processing by SF2) is "drop."

Thus, when SFF1 on SI=1 of SPI=100 notes that the next-hope (SI=2) has an "R" flag, SDN-C 416 may populate the new SPI=200 table as illustrated.

On receiving the packet back from SF1, SFF1 matches the "R" flag and replicates the packet. The replica may receive the new, rewritten SPI 632 (e.g., SPI=200). This packet is forwarded to SFF2. The original has its SI 634 incremented (e.g., SI=3), and then it is forwarded to SFF3. From the perspective of SFF3, the packet has already successfully passed through SFF2.

If the packet "stalls" at SFF2, the rest of the service chain is not affected. Stated otherwise, within SPI=100, the action for SFF2 is to replicate the packet, assign it to SPI=200, and forward it. With that task complete, from the perspective of SPI=100, SF2 is successfully complete. This is a logical result, because SF2 is non-reactive, thus, the rest of the service chain does not care about the result of SF2—all that matters is that the packet (or a duplicate packet) was sent to SF2. Note that in some cases, a plurality of NRSFs may be provided, in which case all of the NRSFs may be chained into SPI=200. In that case, the logical fiction that each of the NRSFs has been successfully completed breaks down somewhat, as it is possible that one NRSF could drop the packet or otherwise fail, in which case the other NRSFs will not receive the packet. Thus, if it is important to maintain the logical fiction that all NRSFs have successfully "completed" (i.e., it is desirable to ensure that each packet is at least delivered to each NRSF), each NRSF may be the subject of its own one-hop SFC. However, this may not always be the case. Some NRSFs are less important, and dropped packets are not an issue, in which case they can be chained behind more-important NRSFs. In other examples, a first NRSFs may actually be at least partially dependent on a second NRSF, meaning that the second NRSFs could be considered "locally reactive." For example, it may be desirable to pass traffic to an experimental NRSF, if and only if, it is successfully logged by an accounting function. In that case, the experimental NRSF can be chained behind the accounting function in a special NRSFC.

FIG. 7 is a flow chart of a method 700 according to one or more examples of the present Specification.

In block 702, a network device, such as an SFF 422 receives an incoming packet, as illustrated in FIG. 6A.

In block 704, the network device parses the service chain. For example, this may comprise isolating the NSH and reading a value for an SPI 362. Note however that NSH is used by way of nonlimiting example only.

In decision block 706, the network device determines whether the next hop in the SFC is an NRSF as described in this Specification.

In block 716, if this is not an NRSF, then no special processing is needed. The network device simply forwards the packet to the next-network device, such as the SF 418 that is to perform the service function. Thereafter, SF 418 performs its work, and the flow continues as normal.

In block 708, if the next-hop SF is an NRSF, then the network device replicates the packet.

In block 710, the network device rewrites the SPI portion of the NSH (or other appropriate header) with a new SPI 362. For example, if the original SPI is SPI=100 (indicating the original SFC), the rewritten SPI may be SPI=200, indicating the special-purpose service chain established for this NRSF (or for a string of NRSFs). The network device may also provide an appropriate SI 364.

In block 712, the network device forwards the packet to the NRSF, which continues to handle it according to normal service chain functionality.

In block 714, the network device decrements the SI 364 of the original packet. Control then passes back to decision block 706. Now, the next-hop SF will not be an NRSF. Rather, it will now point to the next reactive SF in the chain. Thus, control will pass to block 716.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, router 200 may be, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner Along similar design alternatives, any of the illustrated components, modules, and elements of the FIGURES may be combined in various possible configurations, all of which are within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a network computing apparatus, comprising: one or more logic elements, including at least one hardware logic element, comprising a service chain engine to: receive an incoming packet associated with a first service function chain; identify a next hop service function for the incoming packet as a non-reactive service function; create a duplicate packet; forward the duplicate packet to the non-reactive service function; and forward the incoming packet to a next reactive service function.

There is further disclosed an example, wherein forwarding the duplicate packet to the non-reactive service function comprises sending the packet to a non-reactive service function chain.

There is further disclosed an example, wherein the non-reactive service function chain includes only a single service function.

There is further disclosed an example, wherein the single service function is followed by a "drop" action.

There is further disclosed an example, wherein the non-reactive service function chain includes a plurality of non-reactive service functions.

There is further disclosed an example, wherein the plurality of non-reactive service functions includes at least one service function that is locally reactive.

There is further disclosed an example, wherein the plurality of non-reactive service functions is followed by a "drop" action.

There is further disclosed in an example, a network computing apparatus comprising: one or more logic elements, including at least one hardware logic element, comprising a software-defined networking controller engine to: receive an incoming packet associated with a first service function chain (SFC), having a first service path identifier (SPI); determine that the incoming packet has a first service index (SI), and that a next-hop SI identifies a non-reactive service function (NRSF); receive a duplicate packet of the incoming packet; rewrite a service header of the duplicate packet to identify a second SFC having a second SPI, wherein the second SPI is different from the first SPI; and alter the first SI of the incoming packet to identify a next reactive service function in the first SFC.

There is further disclosed an example, wherein the second SFC is a non-reactive service function chain (NRSFC).

There is further disclosed an example, wherein the NRSFC includes only a single service function.

There is further disclosed an example, wherein the single service function is followed by a "drop" action.

There is further disclosed an example, wherein the NRSFC includes a plurality of non-reactive service functions.

There is further disclosed an example, wherein the plurality of non-reactive service functions includes at least one service function that is locally reactive.

There is further disclosed an example, wherein the plurality of non-reactive service functions is followed by a "drop" action.

There is further disclosed in an example, one or more tangible, non-transitory computer-readable storage mediums having stored thereon executing instructions for providing a service chain engine to: receive an incoming packet associated with a first service function chain; identify a next hop service function for the incoming packet as a non-reactive service function; create a duplicate packet; forward the duplicate packet to the non-reactive service function; and forward the incoming packet to a next reactive service function.

There is further disclosed an example, wherein forwarding the duplicate packet to the non-reactive service function comprises sending the packet to a non-reactive service function chain.

There is further disclosed an example, wherein the non-reactive service function chain includes only a single service function.

There is further disclosed an example, wherein the single service function is followed by a "drop" action.

There is further disclosed in an example, one or more tangible, non-transitory computer-readable mediums having stored thereon executable instructions for providing a software-defined networking controller engine to: receive an incoming packet associated with a first service function chain (SFC), having a first service path identifier (SPI); determine that the incoming packet has a first service index (SI), and that a next-hop SI identifies a non-reactive service function (NRSF); receive a duplicate packet of the incoming packet; rewrite a service header of the duplicate packet to identify a second SFC having a second SPI, wherein the second SPI is different from the first SPI; and alter the first SI of the incoming packet to identify a next reactive service function in the first SFC.

There is further disclosed an example, wherein the second SFC is a non-reactive service function chain (NRSFC).

There is further disclosed an example, wherein the NRSFC includes only a single service function.

There is further disclosed an example, wherein the single service function is followed by a "drop" action.

There is further disclosed an example of one or more tangible, non-transitory computer-readable storage mediums having stored thereon executable instructions for instructing one or more processors for providing a service chain engine or software-defined networking controller engine operable for performing any or all of the operations of the preceding examples.

There is further disclosed an example of a method of providing a service chain engine or software-defined networking controller engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A network computing apparatus comprising:
one or more processors configured to:
receive an incoming packet associated with a first service function chain;
parse the first service function chain to determine whether a next hop service function for the incoming packet is a non-reactive service function;
when the next hop service function is identified as the non-reactive service function, modify the incoming packet to include a replicate flag, create a duplicate packet, and forward the duplicate packet to the non-reactive service function, the replicate flag indicating the next hop service function is the non-reactive service function; and
when the next hop service function is not identified as the non-reactive service function, forward the incoming packet to the next service function.

2. The network computing apparatus of claim 1, wherein forwarding the duplicate packet to the non-reactive service function includes sending the incoming packet to a non-reactive service function chain.

3. The network computing apparatus of claim 2, wherein the non-reactive service function chain includes only a single service function.

4. The network computing apparatus of claim 2, wherein the non-reactive service function chain includes a plurality of non-reactive service functions.

5. The network computing apparatus of claim 4, wherein the plurality of non-reactive service functions includes at least one service function that is locally reactive.

6. The network computing apparatus of claim 1, wherein identifying the next hop service function as the non-reactive service function includes matching the replicate flag via a table.

7. The network computing apparatus of claim 1, wherein parsing the first service function chain to determine whether the next hop service function for the incoming packet is the non-reactive service function includes reading a value associated with a service path identifier.

8. A method comprising:
receiving an incoming packet associated with a first service function chain;
parsing the first service function chain to determine whether a next hop service function for the incoming packet is a non-reactive service function;
when the next hop service function is identified as the non-reactive service function, modifying the incoming packet to include a replicate flag, creating a duplicate packet, and forwarding the duplicate packet to the non-reactive service function, the replicate flag indicating the next hop service function is the non-reactive service function; and when the next hop service function is not identified as the non-reactive service function, forwarding the incoming packet to the next service function.

9. The method of claim 8, wherein the forwarding of the duplicate packet to the non-reactive service function includes sending the incoming packet to a non-reactive service function chain.

10. The method of claim 9, wherein the non-reactive service function chain includes only a single service function.

11. The method of claim 9, wherein the non-reactive service function chain includes a plurality of non-reactive service functions.

12. The method of claim 11, wherein the plurality of non-reactive service functions includes at least one service function that is locally reactive.

13. The method of claim 8, wherein identifying the next hop service function as the non-reactive service function includes matching the replicate flag via a table.

14. One or more tangible, non-transitory computer-readable storage mediums having stored thereon executing instructions for providing one or more processors configured to:

receive an incoming packet associated with a first service function chain;

parse the first service function chain to determine whether a next hop service function for the incoming packet is a non-reactive service function;

when the next hop service function is identified as the non-reactive service function, modify the incoming packet to include a replicate flag, create a duplicate packet, and forward the duplicate packet to the non-reactive service function, the replicate flag indicating the next hop service function is the non-reactive service function; and when the next hop service function is not identified as the non-reactive service function, forward the incoming packet to the next service function.

15. The one or more tangible, non-transitory computer-readable storage mediums of claim 14, wherein forwarding the duplicate packet to the non-reactive service function includes sending the incoming packet to a non-reactive service function chain.

16. The one or more tangible, non-transitory computer-readable storage mediums of claim 15, wherein the non-reactive service function chain includes only a single service function.

17. The one or more tangible, non-transitory computer-readable storage mediums of claim 16, wherein the single service function is followed by a "drop" action.

18. The one or more tangible, non-transitory computer-readable storage mediums of claim 15, wherein the non-reactive service function chain includes a plurality of non-reactive service functions.

19. The one or more tangible, non-transitory computer-readable storage mediums of claim 18, wherein the plurality of non-reactive service functions includes at least one service function that is locally reactive or the plurality of non-reactive service functions is followed by a "drop" action.

20. The one or more tangible, non-transitory computer-readable storage mediums of claim 14, wherein identifying the next hop service function as the non-reactive service function includes matching the replicate flag via a table.

\* \* \* \* \*